US010471473B2

(12) United States Patent
Huang et al.

(10) Patent No.: US 10,471,473 B2
(45) Date of Patent: Nov. 12, 2019

(54) SYSTEMS AND METHODS FOR THE MANAGEMENT OF WASTE ASSOCIATED WITH PROCESSING GUAYULE SHRUBS TO EXTRACT RUBBER

(71) Applicant: Bridgestone Corporation, Tokyo (JP)

(72) Inventors: Yingyi Huang, Hudson, OH (US); Hiroshi Mouri, Tokyo (JP); Robert W. Handlos, Uniontown, OH (US); Jenny L. Sheaffer, Waite Hill, OH (US)

(73) Assignee: Bridgestone Corporation, Tokyo (JP)

(*) Notice: Subject to any disclaimer, the term of this patent is extended or adjusted under 35 U.S.C. 154(b) by 1083 days.

(21) Appl. No.: 14/409,117

(22) PCT Filed: Jun. 18, 2013

(86) PCT No.: PCT/US2013/046328
§ 371 (c)(1),
(2) Date: Dec. 18, 2014

(87) PCT Pub. No.: WO2013/192182
PCT Pub. Date: Dec. 27, 2013

(65) Prior Publication Data
US 2015/0190848 A1 Jul. 9, 2015

Related U.S. Application Data

(60) Provisional application No. 61/660,983, filed on Jun. 18, 2012.

(51) Int. Cl.
| B07B 11/06 | (2006.01) |
| A01D 45/00 | (2018.01) |
| B02C 23/08 | (2006.01) |
| B29B 15/02 | (2006.01) |
| C08C 2/06 | (2006.01) |
| C08C 4/00 | (2006.01) |
| C08J 11/06 | (2006.01) |
| B29K 7/00 | (2006.01) |

(52) U.S. Cl.
CPC .............. *B07B 11/06* (2013.01); *A01D 45/00* (2013.01); *B02C 23/08* (2013.01); *B29B 15/02* (2013.01); *C08C 2/06* (2013.01); *C08C 4/00* (2013.01); *C08J 11/06* (2013.01); B29K 2007/00 (2013.01); C08J 2307/00 (2013.01); Y02W 30/701 (2015.05)

(58) Field of Classification Search
CPC .......... B02C 23/08; B07B 11/06; C08C 2/00; C08C 3/00; C08C 4/00; C08J 11/06; C08J 2307/00; Y02W 30/701; B29K 2007/00; A01D 45/00; B29B 15/02
USPC ....................................................... 241/24.1
See application file for complete search history.

(56) References Cited

U.S. PATENT DOCUMENTS

| 702,678 A | 6/1902 | Prampolini |
| 741,258 A | 10/1903 | Lawrence |
| 814,407 A | 3/1906 | Von Stechow |
| 843,567 A | 2/1907 | Bradshaw |
| 957,495 A | 5/1910 | Chute et al. |
| 979,902 A | 9/1910 | Van der Linde |
| 999,493 A | 8/1911 | Ellis |
| 999,708 A | 8/1911 | Ellis |
| 1,003,139 A | 9/1911 | Kelley |
| 1,007,681 A | 11/1911 | Ellis |
| 1,051,987 A | 2/1913 | Chute |
| 1,103,903 A | 7/1914 | Kendall |
| 1,105,568 A | 7/1914 | Kendall |
| 1,135,236 A | 4/1915 | Wheeler et al. |
| 1,161,135 A | 11/1915 | Kaminski et al. |
| 1,167,264 A | 1/1916 | Brooks |
| 1,189,549 A | 7/1916 | Ellis |
| 1,189,550 A | 7/1916 | Ellis |
| 1,242,886 A | 10/1917 | Meyer |
| 1,247,814 A | 11/1917 | Garza |
| 1,550,319 A | 8/1925 | Hopkinson |
| 1,671,570 A | 5/1928 | Carnahan |
| 1,695,676 A | 12/1928 | Yeandle |
| 1,735,835 A | 11/1929 | Kohno |
| 1,740,079 A | 12/1929 | Edison |
| 1,753,184 A | 4/1930 | Spence |

(Continued)

FOREIGN PATENT DOCUMENTS

| AU | 2012202924 A | 5/1942 |
| CN | 1442193 A | 4/2003 |

(Continued)

OTHER PUBLICATIONS

Kim, Dong Seok, International Search Report with Written Opinion from PCT/US2013/046328, 12 pp. (dated Oct. 11, 2013).

(Continued)

*Primary Examiner* — Shelley M Self
*Assistant Examiner* — Smith Oberto Bapthelus
(74) *Attorney, Agent, or Firm* — Meredith E. Hooker; Jenny L. Sheaffer

(57) ABSTRACT

Systems and methods for managing the waste associated with the extraction of rubber from guayule shrubs are provided. Also provided is a portable local sub-station for reducing the transportation costs associated with the processing of guayule shrubs for the extraction of rubber. Use of the disclosed systems, methods and/or local sub-station can reduce transportation costs, reduce processing costs and reduce the downstream processing complexity associated with the extraction of rubber from guayule shrubs.

17 Claims, No Drawings

(56) References Cited

U.S. PATENT DOCUMENTS

| | | | |
|---|---|---|---|
| 1,753,185 A | 4/1930 | Spence | |
| 1,829,502 A | 10/1931 | Calcott et al. | |
| 1,989,502 A | 10/1931 | Calcott et al. | |
| 1,833,287 A | 11/1931 | Hadley | |
| 1,903,500 A | 4/1933 | Calcott | |
| 2,138,895 A | 12/1938 | Wiezevich | |
| 2,187,146 A | 1/1940 | Calcott et al. | |
| 2,281,336 A | 4/1942 | Stacom | |
| 2,339,418 A * | 1/1944 | McKay | A23L 7/115 |
| | | | 426/103 |
| 2,364,394 A | 12/1944 | Sibley | |
| 2,373,689 A | 4/1945 | Kenda | |
| 2,387,521 A | 10/1945 | Martin | |
| 2,390,860 A | 12/1945 | Williams | |
| 2,399,156 A | 4/1946 | Stamberger et al. | |
| 2,408,853 A | 10/1946 | Hoover et al. | |
| 2,410,780 A | 11/1946 | Gracia | |
| 2,410,781 A | 11/1946 | Gracia | |
| 2,425,011 A | 8/1947 | Smith | |
| 2,434,412 A | 1/1948 | Jones | |
| 2,459,369 A | 1/1949 | Tint et al. | |
| 2,475,141 A | 7/1949 | Jones | |
| 2,522,136 A | 9/1950 | Schaffer | |
| 2,549,763 A | 4/1951 | Banigan, Jr. et al. | |
| 2,572,046 A | 10/1951 | Meeks et al. | |
| 2,618,670 A | 11/1952 | Clark | |
| 2,665,317 A | 1/1954 | Clark et al. | |
| 2,744,125 A | 5/1956 | Meeks et al. | |
| 2,864,561 A * | 12/1958 | Mork | B02C 21/02 |
| | | | 209/420 |
| 3,141,281 A | 7/1964 | Guant et al. | |
| 3,311,601 A | 3/1967 | Conley | |
| 3,376,158 A | 4/1968 | Buser | |
| 4,107,902 A | 8/1978 | Suggs | |
| 4,122,012 A | 10/1978 | Blasnik | |
| 4,136,131 A * | 1/1979 | Buchanan | C08C 4/00 |
| | | | 524/926 |
| 4,159,903 A | 7/1979 | Bauman | |
| 4,198,324 A | 4/1980 | Lal et al. | |
| 4,243,561 A | 1/1981 | Lal et al. | |
| 4,246,001 A | 1/1981 | Bauman | |
| 4,269,242 A * | 5/1981 | Smith | B27L 7/00 |
| | | | 144/192 |
| 4,272,436 A | 6/1981 | Lal et al. | |
| 4,363,188 A | 12/1982 | Dastoor et al. | |
| 4,376,189 A | 3/1983 | Trivette | |
| 4,376,835 A | 3/1983 | Schmitt et al. | |
| 4,376,853 A | 3/1983 | Gutierrez et al. | |
| 4,405,532 A | 9/1983 | Gutierrez et al. | |
| 4,410,656 A | 10/1983 | Coran et al. | |
| 4,412,031 A | 10/1983 | Kitahara et al. | |
| 4,412,041 A | 10/1983 | Kitahura et al. | |
| 4,424,171 A | 1/1984 | Gutierrez et al. | |
| 4,433,114 A | 2/1984 | Coran et al. | |
| 4,434,266 A | 2/1984 | Trivette, Jr. | |
| 4,435,337 A | 3/1984 | Kay et al. | |
| 4,493,925 A | 1/1985 | Trivette, Jr. | |
| 4,496,683 A | 1/1985 | Morita | |
| 4,499,243 A | 2/1985 | Rader | |
| 4,513,110 A | 4/1985 | Rader | |
| 4,525,541 A | 6/1985 | Kitahara et al. | |
| 4,526,929 A | 7/1985 | Kishida et al. | |
| 4,526,959 A | 7/1985 | Kay et al. | |
| 4,530,995 A | 7/1985 | Gutierrez et al. | |
| 4,542,191 A | 9/1985 | Kay et al. | |
| 4,557,306 A | 12/1985 | Graves | |
| 4,559,378 A | 12/1985 | Kay et al. | |
| 4,568,711 A | 2/1986 | Kay et al. | |
| 4,570,690 A | 2/1986 | Graves | |
| 4,585,826 A | 4/1986 | Graves | |
| 4,591,631 A * | 5/1986 | Beattie | C09F 1/00 |
| | | | 528/493 |
| 4,591,632 A | 5/1986 | Moore | |
| 4,609,336 A | 9/1986 | Stevenson et al. | |
| 4,616,068 A | 10/1986 | Schloman, Jr. et al. | |
| 4,616,075 A | 10/1986 | Malani et al. | |
| 4,621,118 A | 11/1986 | Schloman, Jr. et al. | |
| 4,622,365 A | 11/1986 | Scholman, Jr. et al. | |
| 4,623,713 A | 11/1986 | Beinor et al. | |
| 4,638,028 A | 1/1987 | Lui et al. | |
| 4,647,607 A | 3/1987 | Kay et al. | |
| 4,677,153 A | 6/1987 | Kitahara et al. | |
| 4,678,860 A | 7/1987 | Kuester | |
| 4,681,929 A | 7/1987 | Cole et al. | |
| 4,684,715 A | 8/1987 | Kay et al. | |
| 4,687,810 A | 8/1987 | Coran | |
| 4,728,343 A | 3/1988 | Snyder | |
| 4,739,037 A * | 4/1988 | Kay | C09F 1/00 |
| | | | 528/493 |
| 4,739,038 A | 4/1988 | Schloman, Jr. | |
| 4,751,271 A | 6/1988 | Graves | |
| 4,761,446 A | 8/1988 | Graves et al. | |
| 4,762,870 A | 8/1988 | Graves et al. | |
| 4,778,857 A | 10/1988 | Graves et al. | |
| 4,786,683 A | 11/1988 | Schloman, Jr. et al. | |
| 4,792,583 A | 12/1988 | Coran | |
| 4,804,741 A * | 2/1989 | Verbiscar | C08C 2/06 |
| | | | 528/503 |
| 4,822,845 A | 4/1989 | Graves et al. | |
| 4,829,117 A | 5/1989 | Schloman, Jr. et al. | |
| 4,927,887 A | 5/1990 | Tate | |
| 4,975,497 A | 12/1990 | Tate et al. | |
| 4,983,729 A | 1/1991 | Sikora | |
| 4,988,388 A | 1/1991 | Schloman | |
| 5,234,564 A * | 8/1993 | Smith | B07B 1/005 |
| | | | 209/241 |
| 5,247,009 A | 9/1993 | Kitahara | |
| 5,272,203 A | 12/1993 | Joyner | |
| 5,306,862 A | 4/1994 | Cappell et al. | |
| 5,321,111 A | 6/1994 | Ji | |
| 5,362,807 A | 11/1994 | Nogura et al. | |
| 5,379,948 A * | 1/1995 | Teppo | B02C 4/08 |
| | | | 241/23 |
| 5,411,147 A * | 5/1995 | Bond | B03B 9/06 |
| | | | 209/44.4 |
| 5,453,051 A * | 9/1995 | Schlough | A01D 45/02 |
| | | | 460/113 |
| 5,468,539 A * | 11/1995 | Crivelli | B29B 17/0042 |
| | | | 404/32 |
| 5,473,024 A | 12/1995 | Thames et al. | |
| 5,580,942 A | 12/1996 | Cornish | |
| 5,599,868 A | 2/1997 | Bohm et al. | |
| 5,616,075 A | 4/1997 | Winstanley et al. | |
| 5,633,433 A | 5/1997 | Backhaus et al. | |
| 5,645,234 A * | 7/1997 | Del Zotto | B02C 18/145 |
| | | | 241/101.76 |
| 5,651,953 A | 7/1997 | Yokohama et al. | |
| 5,717,050 A | 2/1998 | Cornish | |
| 5,872,186 A | 2/1999 | Ang | |
| 5,998,512 A | 12/1999 | Schloman | |
| 6,014,998 A | 1/2000 | Mowdood | |
| 6,054,525 A | 4/2000 | Schloman et al. | |
| 6,132,711 A | 10/2000 | Backhaus et al. | |
| 6,231,970 B1 | 5/2001 | Andersen et al. | |
| 6,382,425 B1 * | 5/2002 | Brickner | B07B 1/005 |
| | | | 209/12.1 |
| 6,399,673 B1 | 6/2002 | Thames et al. | |
| 6,482,884 B1 | 11/2002 | Schaal | |
| 6,645,747 B1 | 11/2003 | Hallahan et al. | |
| 6,726,025 B1 * | 4/2004 | Huskey | B03B 9/061 |
| | | | 209/420 |
| 6,734,245 B2 | 5/2004 | Baranek | |
| 6,787,590 B2 | 9/2004 | Nakayama et al. | |
| 6,818,676 B2 | 11/2004 | Koffler et al. | |
| 7,026,678 B2 | 4/2006 | Coursey | |
| 7,205,456 B2 | 4/2007 | Hallahan et al. | |
| 7,228,881 B1 * | 6/2007 | Smith | B27B 17/0091 |
| | | | 144/193.1 |
| 7,259,231 B2 | 8/2007 | Cornish et al. | |
| 7,540,438 B2 | 6/2009 | Buranov | |
| 7,629,397 B2 | 12/2009 | McDonald et al. | |
| 7,790,036 B2 | 9/2010 | Cornish et al. | |

(56) References Cited

U.S. PATENT DOCUMENTS

| | | | |
|---|---|---|---|
| 7,851,210 B2* | 12/2010 | Darling | A23J 1/002 426/53 |
| 7,923,039 B2* | 4/2011 | Cornish | B01D 11/0284 424/725 |
| 7,955,611 B2 | 6/2011 | Brown et al. | |
| 8,013,213 B2 | 9/2011 | Mau et al. | |
| 8,080,358 B2 | 12/2011 | Murakami | |
| 8,241,873 B2 | 8/2012 | Diner et al. | |
| 8,268,121 B2 | 9/2012 | Blount | |
| 8,815,965 B2* | 8/2014 | Cole | C08C 1/02 521/44.5 |
| 9,138,660 B2 | 9/2015 | Yahamoto | |
| 9,315,589 B2 | 4/2016 | Huang et al. | |
| 9,328,211 B2 | 5/2016 | Nemato et al. | |
| 9,546,224 B2 | 1/2017 | Cole et al. | |
| 9,562,720 B2 | 2/2017 | Huang et al. | |
| 9,567,457 B2 | 2/2017 | Huang et al. | |
| 9,611,334 B2 | 4/2017 | Huang et al. | |
| 9,637,562 B2 | 5/2017 | Huang et al. | |
| 9,890,262 B2 | 2/2018 | Huang et al. | |
| 2002/0006987 A1 | 1/2002 | Nakayama | |
| 2003/0138403 A1* | 7/2003 | Drustrup | A61K 9/0019 424/85.4 |
| 2004/0265343 A1 | 12/2004 | Hill | |
| 2005/0011812 A1 | 1/2005 | Nelson | |
| 2005/0050759 A1 | 3/2005 | Chandran et al. | |
| 2006/0070167 A1 | 4/2006 | Eng et al. | |
| 2006/0106183 A1 | 5/2006 | Cornish et al. | |
| 2006/0149015 A1* | 7/2006 | Cornish | B01D 11/0284 528/1 |
| 2006/0217512 A1 | 9/2006 | Mau et al. | |
| 2006/0218660 A1 | 9/2006 | Dong et al. | |
| 2006/0225144 A1 | 10/2006 | Hallahan et al. | |
| 2007/0265408 A1 | 11/2007 | Cornish et al. | |
| 2007/0276112 A1* | 11/2007 | Buranov | C08C 3/00 528/1 |
| 2008/0015336 A1 | 1/2008 | Cornish et al. | |
| 2008/0172998 A1* | 7/2008 | Fraley | A01D 43/06 56/14.6 |
| 2008/0221246 A1 | 9/2008 | Imam et al. | |
| 2008/0300526 A1 | 12/2008 | Gumbs | |
| 2008/0317933 A1* | 12/2008 | Williamson | B02C 4/08 426/629 |
| 2009/0054595 A1 | 2/2009 | Cornish et al. | |
| 2009/0099309 A1 | 4/2009 | Gumbs | |
| 2009/0099327 A1 | 4/2009 | Cornish et al. | |
| 2009/0163689 A1 | 6/2009 | Cornish et al. | |
| 2009/0191243 A9 | 7/2009 | Hill et al. | |
| 2009/0199425 A1 | 8/2009 | Taylor | |
| 2009/0256375 A1* | 10/2009 | Haskins | B02C 13/02 296/24.32 |
| 2010/0210745 A1* | 8/2010 | McDaniel | C09D 5/008 521/55 |
| 2011/0021743 A1 | 1/2011 | Cornish et al. | |
| 2011/0054051 A1 | 11/2011 | Cole et al. | |
| 2011/0275142 A1 | 11/2011 | Wade et al. | |
| 2013/0029009 A1* | 1/2013 | Darling | C12M 21/12 426/59 |
| 2013/0067808 A1* | 3/2013 | Stachon | A01G 7/00 47/58.1 R |
| 2014/0336288 A1 | 11/2014 | Cole et al. | |
| 2015/0073113 A1 | 3/2015 | Huang et al. | |
| 2015/0126673 A1 | 5/2015 | Randall et al. | |
| 2015/0136882 A1 | 5/2015 | Huang et al. | |
| 2015/0184933 A1 | 7/2015 | Huang et al. | |
| 2015/0190848 A1* | 7/2015 | Huang | B29B 15/02 241/24.1 |
| 2017/0081429 A1 | 5/2017 | Cole et al. | |
| 2017/0146291 A1 | 5/2017 | Huang et al. | |
| 2017/0152326 A1 | 6/2017 | Huang et al. | |
| 2017/0226309 A1 | 8/2017 | Huang et al. | |

FOREIGN PATENT DOCUMENTS

| | | |
|---|---|---|
| CN | 1860850 A | 11/2006 |
| CN | 101671404 A | 3/2010 |
| CN | 101906176 A | 12/2010 |
| EA | 2011170418 A1 | 12/2011 |
| EP | 87109 A1 | 8/1983 |
| EP | 100434 A2 | 2/1984 |
| EP | 105822 A2 | 4/1984 |
| EP | 164137 A2 | 12/1985 |
| EP | 179211 A1 | 4/1986 |
| EP | 180716 A1 | 5/1986 |
| EP | 87109 B1 | 10/1986 |
| EP | 0039910 B1 | 4/1987 |
| EP | 105822 B1 | 6/1988 |
| EP | 180716 B1 | 4/1989 |
| EP | 164137 B1 | 6/1990 |
| EP | 476641 B1 | 3/1992 |
| EP | 491229 B1 | 6/1992 |
| EP | 0509768 A2 | 10/1992 |
| EP | 179211 B1 | 7/1998 |
| EP | 938350 B1 | 11/2006 |
| EP | 1752277 A2 | 2/2007 |
| EP | 675202 A1 | 10/2009 |
| EP | 1969036 B1 | 3/2011 |
| GB | 545410 A | 5/1942 |
| GB | 2164341 A | 3/1986 |
| GB | 2174403 A | 11/1986 |
| JP | S61-264005 A | 11/1986 |
| JP | 62000502 A | 1/1987 |
| JP | H06-100704 A | 4/1994 |
| JP | H08-283309 A | 10/1996 |
| JP | H11-012306 A | 1/1999 |
| JP | 2003-040902 A | 2/2003 |
| JP | 2003-313366 A | 11/2003 |
| JP | 2006348607 A | 12/2006 |
| JP | 2007-126676 A | 5/2007 |
| JP | 2007224067 A | 9/2007 |
| RU | 2027746 C1 | 1/1995 |
| SU | 15590 A1 | 6/1930 |
| SU | 47819 A1 | 7/1936 |
| SU | 47820 A1 | 7/1936 |
| SU | 50447 A1 | 11/1936 |
| SU | 66332 A1 | 11/1945 |
| SU | 72175 A1 | 11/1947 |
| WO | 1981003255 A1 | 11/1981 |
| WO | 9803255 A1 | 1/1998 |
| WO | 2001010946 A2 | 2/2001 |
| WO | 2001049257 A1 | 7/2001 |
| WO | 2009054595 A1 | 4/2009 |
| WO | 2009095059 A1 | 8/2009 |
| WO | 2009129249 A2 | 10/2009 |
| WO | 2013134429 A1 | 9/2013 |
| WO | 2013134430 A1 | 9/2013 |
| WO | 2013173625 A1 | 11/2013 |
| WO | 2013192182 A1 | 12/2013 |
| WO | 2013192217 A1 | 12/2013 |
| WO | 2013192227 A1 | 12/2013 |
| WO | 2015038707 A1 | 3/2015 |

OTHER PUBLICATIONS

International Products Brochure 2007.

Abstract—Week 200365 Thomson Scientific, London, GB; AN 2003-682828; XP000002567182, JP 2003 040902 A (Nitto Denko Corp) (dated Feb. 13, 2003).

Adler, R.J. et al., Freeze Coagulation of ABS Latex, Ind. Eng. Chem. Res. vol. 36 pp. 2156-2162 (dated 1997).

ASTM International, Standard Test Methods for Rubber from Natural Sources—Chemical Analysis, D 1278, 2002, pp. 246-251.

Bedane, G. M., et al., Development and Evaluation of a Guayule Debarker, Industrial Crops and Products, vol. 34, pp. 1256-1261 (2011).

Beintema, Nienke, Rubber From Dandelions and Shrubs, Wageningen World, No. 1, pp. 16-17, 2012.

Belmares, H. et al. New Rubber Peptizers and Coatings Derived from Guayule Resin, Industrial and Engineering Chemistry: Product Research and Development, vol. 19, pp. 107-111 (1980).

(56) References Cited

OTHER PUBLICATIONS

Benedict, H.M. The Effect of Waste Products From the Guayule Rubber Mill on the Growth of Various Crops. Journal of the American Society of Agronomy, vol. 40: pp. 1005-1016 (1948).
Bhowmick, et al. Effect of Resin Components on the Degradation of Guayule Rubber, Journal of Applied Polymer Science, vol. 30, pp. 2367-2388 (dated 1985).
Biosolids Dewatering, Promotional Mateiral, FKC Co. Ltd., accessed Jul. 30, 2015 at http://fkescrewpress.com/docs/fkcbiosolids2.pdf.
Bonner, J., and A.W. Galson. Toxic Substances From the Culture Media of Guayule Which May Inhibit Growth. Botanical Gazette, vol. 106; pp. 185-198 (1944).
Buranov, Anvar U., et al., Extraction and Characterization of Latex and Natural Rubber from Rubber-Bearing Plants, J. Agric. Food Chem. 2010, 58, 734-743.
Buranov, Anvar, et al., "Rubber-Bearing Plants of Central Asia," Conf. Title Industrial Crops and Rural Development, Conf. date Sep. 17, 2005.
Cataldo, F. Guayule Rubber: A New Possible World Scenario for the Production of Natural Rubber Progress in Rubber and Plastics Technology, vol. 16, No. 1 (dated 2000).
Centrifugation and Centrifuges, Lenntech, accessed Dec. 6, 2011 at http://www.lenntech.com/library/clarification/centrifugation.htm.
Chang, M., and G.T. Tsao. Hydrolysis of Guayule Cellulose for Alcohol Production. E.C. Gregg, J.L. Tipton and H.T. Huang, ends., Proceedings of the Third International Guayule Conference, Pasadena, Clif., Guayule Rubber Soc.: Riverside, Calif., pp. 211-224 (1983).
Crown Model IV and Model V Extractors, Flyer, Crown Iron Works Company, accessed Jul. 30, 2015 at http://www.crowniron.com/userfiles/image/specialty%20extractor%20insert1.pdf (dated Nov. 2006).
Curtis, Jr., "Distribution of Rubber and Resins in Guayule", Plance Physiology, vol. 22, No. 4, pp. 333-359 (dated Oct. 1947).
Decanters from GEA Westfalia Separator, Mechanical Separation, GE Westfalia Separator, www.westfalia-separator.com (2010).
Doering, "Guayule Rubber in Tires and Tubes, Service Tests in Which the Rubber was Exclusively Guayule", Industrial and EngineeringChemistry, vol. 26, No. 5, pp. 541-543, (dated May 1934).
Extraction Decanters from GEA Westfalia Separator, GEA Westfalia Separator Group, accessed May 30, 2012 at http://www.westfalia-separator.com/products/decanters/extraction-decanters.html.
Gelling, I.R. Modification of Natural Rubber Latex With Peracetic Acid. Rubber Chemistry and Technology. vol. 58, pp. 86-96. (1985).
Himayah H. Naqvi and George P. Hanson; American Journal of Botany, vol. 69, No. 6 (Jul. 1982) pp. 985-989; Germination and Growth Inhibitors in Guayule (*Parthenium argentatum* Gray) Chaff and Their Possible Influence in Seed Dormancy.
Jordi Labs, printout from http://lifescience.ca/DAT/CATALOGUE/211~v~Polymer_Solubility_Index.pdf, printed Aug. 5, 2014.
Keller, B.A., editor, Rubber and Rubber-Plants (book), pp. 408-410, published 1936.
Keller, R.W., D.S. Winkler, and H.L. Stephens. Degradative Effects of Guayule Resin on Natural Rubber. Rubber Chemistry and Technology. vol. 54, pp. 115-123, (1981).
King, R.J., and D.M. Mondimore. HPLC Procedure for the determination of Free Sulfur in Natural Rubber Formulations, Rubber Chemistry and Technology. vol. 60, pp. 716-720 (1987).
Kuester, J.L., C.M. Fernandez, T.C. Wang, and G. Heath. Liquid Hydrocarbon Fuel Potential of Agricultural Materials. In R.P. Overend, T.A. Milne, and L.K. Mudge, eds., International Conference on Fundamentals of Thermochemical Biomass Conversion, 1982, Estes Park Colo., Elsevier Applied Science: London, pp. 875-895 (1985).
Kuester, J.L., Liquid Hydrocarbon Fuels From Biomass (1981).
Makitra, et al., "Dependence of Natural Rubber Swelling Index Upon Organic Solvents Properties", Chemistry & Chemical Technology, vol. 5, No. 1, pp. 19-24 (dated 2011).
McIntyre, et al., "Guayule Rubber," Handbook of Elastomers, pp. 1-27 (dated 2001).

Meeker, T.R.; Specialty Isoprene Based Polymers—Derivatives From the General Purpose Polymers; Doc. 1848; Spring 1985.
Murphy, J. Brad and C.A. Stutte; Analyitical Biochemistry 86, 220-228 (1978); Analysis for Substituted Benzoic and Cinnamic Acids Using High-Pressure Liquid Chromatography.
Presentation pages by Schloman, W.W., Jr. undated (submitted via third party observations in PCT/US2013/041422 on Aug. 6, 2014).
Reynolds, Cynthia, "The Russians Are Coming," www2.macleans.ca/2011/08/11/the-russians-are-coming, Aug. 11, 2011.
Rubber Developments vol. 39 No. 1, pp. 23-24; Your Questions Answered (1986).
Rysselberge, Jacques Van, Utilisation De Bitumes Elastomeres (1976).
Schloman, W. W. Jr., et al., Seasonal Effects on Guayule Resin Composition, J. Agricultrual and Food Chemistry, vol. 34, pp. 177-179 (1986).
Schloman, W.W. Jr. et al., Rubber Additives Derived from Guayule Resin, Industrial and Eng'r Chem. Research, vol. 27, pp. 712-716 (1988).
Schloman, W.W. Jr., et al., Guayule Byproduct Evaluation: Extract Characterization, J. Agricultural and Food Chemistry, vol. 31 pp. 873-876 (1983).
Schloman, W.W. Jr., et al., Water Stress and Seasonal Effects on Rubber Quality in Irrigated Guayule, J. Agricultural and Food Chemistry vol. 34, pp. 683-685 (1986).
Schloman, W.W., Jr., "Processing Guayule for Latex and Bulk Rubber," Industrial Crops and Products, vol. 22 No. 1, pp. 41-47, 2005.
Screw Press Operating Hints (CC series), Vincent Corporation, accessed May 31, 2012 at http://www.vincentcorp.com/screw_press_operating_hints_%28cp%20series%29 (dated Mar. 26, 2009).
Screw press, Wikipedia, accessed May 28, 2012 at http://wikipedia.org/wiki/screw_press.
Sin Siew Weng, Some Traditional and New Uses of Skim Rubber, Rubber Research Institute of Malaysia, Proceedings of RRIM Planters Conference (1981).
Stillage Dewatering Screw Press, Promotional Material, FKC Co. Ltd, accessed Jul. 30, 2015 at http://www.fkescrewpress.com/docs/spentgrain_stillageflyerweb.pdf.
Subramaniam, A., J. Rubb. Res. Inst. Malaysia 25(2), 61-68; estimation of Aldehyde Groups in Natural Rubber with 2, 4-dinitrophenylhydrazine (1977).
Tanaka, Y. Structural Characterization of Natural Polyisoprenes: Solve the Mystery of Natural Rubber Based on Structural Study Rubber Chemistry and Technology vol. 74, 355, (dated 2001).
Touzinsky, G.F.; Northern Regional Research Center; Agricultural Research, Science and Education Administration; Guayule as a Source of papermaking Fiber, 5th International Dissolving Pulps Conference, Vienna, pp. 311-315 (1980).
Van Beillen, Jan B, et al., "Guayule and Russian dandelion as alternative sources of natural rubber," CRC Critical Reviews in Biotechnology, CRC Press, vol. 27, No. 1, Jan. 2007, pp. 217-231.
Vincent Corporation, Screw Press Operating Hints, Sep. 17, 2009.
Agricultural Encyclopedia of China (Volume of Crops), vol. one, compiled by Editorial Dept. form Agricultural Encyclopedia of China, pp. 719-720, China Agricultural Press, Apr. 1991.
Australian Patent Exam Report for 2009236328 dated Jul. 2, 2013.
Second Australian Patent Exam Report 2009236328 dated Jan. 30, 2014.
Response to Australian Office Action, (dated Dec. 23, 2013).
First Office Action in Chinese Application No. 2009801224454 (dated Mar. 27, 2012).
Second Office Action in Chinese Application No. 2009801224454 (dated Jun. 27, 2012).
EP 09733501 Communication Pursuant to Article 94(3) EPC, (dated May 10, 2012).
Extended Search Report, EP 09733501 (dated Aug. 19, 2011).
Response to the Extended European Search Report dated Mar. 8, 2012.
Response to European Office Action dated Sep. 20, 2012.
Communication pursuant to Article 94(3) EPC dated Jan. 15, 2013.
Invitation pursuant to Article 94 (3) and Rule 71(1) EPC dated Feb. 8, 2013.

(56) References Cited

OTHER PUBLICATIONS

Response to EPO dated Apr. 9, 2013.
Notification of Intent to Grant from European Patent Office dated Jun. 12, 2013.
Japanese Office Action for 2011-505140 dated Jan. 7, 2014.
Non-final Office Action issued in U.S. Appl. No. 12/937,284 dated Dec. 11, 2012.
Response filed in U.S. Appl. No. 12/937,284 dated Jun. 13, 2013.
Final Office Action issued in U.S. Appl. No. 12/937,284 dated May 31, 2013.
Response filed in U.S. Appl. No. 12/937,284 dated Oct. 30, 2013.
Non-final Office Action issued in U.S. Appl. No. 12/937,284 dated Nov. 13, 2013.
Response filed in U.S. Appl. No. 12/937,284 dated Mar. 31, 2014.
Notice of allowance issued in U.S. Appl. No. 12/937,284 dated Apr. 16, 2014.
Non-final Office Action issued in U.S. Appl. No. 14/338,581 dated Feb. 3, 2016.
Response filed in U.S. Appl. No. 14/338,581 dated Apr. 19, 2016.
Notice of Allowance issued in U.S. Appl. No. 14/338,581 dated May 2, 2016.
RCE filed on Aug. 2, 2016 in U.S. Appl. No. 14/338,581.
Notice of Allowance issued in U.S. Appl. No. 14/338,581 dated Aug. 30, 2016.
Non-final office action issued in U.S. Appl. No. 15/364,527 dated Feb. 13, 2018.
International Preliminary Report on Patentability and Written Opinion (corresponding PCT Application No. PCT/US2009/040543); Authorized Officer Athina Nckitas-Etienne; (8 pages) (dated Oct. 19, 2010).
International Search Report (corresponding PCT Application No. PCT/US2009/040543); Authorized Officer Kang, Hyunk Seok; (2 pages) ( dated Nov. 9, 2009).
Examination report issued in application No. AU2013230936 (dated Feb. 26, 2016).
Response filed on May 16, 2016 in application No. AU2013230936).
Examination report issued in application No. AU2016222428 (dated Jan. 2017).
Response filed in Aug. 2017 in AU application 2016222428.
Response filed on Apr. 22, 2016 in AU application 2013230935.
Examination report issued in application No. AU2013230935 (dated Feb. 25, 2016).
Examination report issued in application AU2016213719 (dated Jan. 2017).
Response filed in application AU2016213719 in Mar. 2017.
Office Action issued in application No. CN2013-80021313.9 (dated Jun. 2, 2015).
Office Action issued in application No. CN2013-80021313.9 (dated Nov. 3, 2015).
Office Action issued in application No. CN201380021313.9 (dated Jan. 18, 2016).
Office Action issued in application No. CN201380021313.9 (dated Dec. 2016).
Third Office Action dated May 2016 in CN application 201380023740.0.
Office Action issued in application No. CN201380023740.0 (dated May 26, 2015).
Office Action issued in application No. CN2013-80023740.0 (dated Dec. 16, 2015).
Fourth Office Action issued in application No. CN2013-80023740.0 (dated Oct. 2016).
Decision of Rejection issued in application No. CN2013-80023740.0 (dated May 2017).
Supplemental European Search Report in EP national stage (EP13758291.2) from PCT/US2013/02951, dated Oct. 26, 2015.
Response submitted in application No. EP13758291.2 (filed Apr. 14, 2016).
European Search Report in EP application (16205645), dated May 11, 2017.
Response submitted in appliation No. EP16205645 on Dec. 7, 2017.
Grant notice issued in application No. EP16205645 dated Mar. 23, 2018.
Supplemental European Search Report in EP national stage (EP13757665.8) from PCT/US2013/029449), dated Oct. 26, 2015.
Response submitted in application No. EP13757665.8 (filed Apr. 14, 2016).
European Search Report and Opinion in EP application 17168837, dated Jun. 30, 2017 and May 29, 2017.
Response submitted in application No. EP17168837.7 dated Mar. 13, 2018.
Office action issued in RU application No. 2014140181 dated Feb. 14, 2017.
Office action issued in RU application No. 2014140183 dated Feb. 10, 2017.
Office action dated May 4, 2015 in U.S. Appl. No. 14/383,379.
Response filed Jul. 31, 2015 in U.S. Appl. No. 14/383,379.
Notice of Allowance dated Aug. 19, 2015 in U.S. Appl. No. 14/383,379.
Notice of allowanced dated Feb. 29, 2016 in U.S. Appl. No. 14/383,379.
Response submitted Jul. 7, 2016 in U.S. Appl. No. 14/383,380.
Final Office Action dated Jul. 21, 2016 in U.S. Appl. No. 14/383,380.
Office action dated Apr. 12, 2016 in U.S. Appl. No. 14/383,380.
Response submitted Sep. 1, 2016 in U.S. Appl. No. 14/383,380.
Notice of alllowance dated Dec. 27, 2017 in U.S. Appl. No. 14/383,380.
Office action dated Jul. 29, 2016 in U.S. Appl. No. 15/130,050.
Response filed Oct. 13, 2016 in U.S. Appl. No. 15/130,050.
Notice of allowance dated Nov. 21, 2016 in U.S. Appl. No. 15/130,050.
Non-final office action rejection from U.S. Appl. No. 15/477,152 dated Jun. 28 2017.
Response filed Sep. 28, 2017 in U.S. Appl. No. 15/477,152.
Notice of allowance dated Oct. 6, 2017 in U.S. Appl. No. 15/477,152.
International Preliminary Report on Patentability and Written Opinion (PCT Application No. PCT/US2013/029451), dated Sep. 2, 2014.
Search Report from PCT/US2014/029451, dated Jun. 21, 2013.
International Preliminary Report on Patentability and Written Opinion (PCT Application No. PCT/US2013/029449), dated Sep. 22, 2014.
Search Report from PCT/US2014/029449, dated Jun. 21, 2013.
Examination report dated Mar. 2016 in AU application 2013262725.
Response filed in AU application 2013262725 (dated Aug. 10, 2016).
Second examination report dated Aug. 23, 2016 in AU application 2013262725.
Response filed in AU application 2013262725 (dated Sep. 12, 2016).
Allowance dated Sep. 23, 2016 in AU application 2013262725.
Examination reported issued in AU application 2017200069 dated Aug. 2017.
Response submitted in AU application 2017200069 dated Mar. 2018.
Grant notice issued in AU application 2017200069 dated Apr. 2018.
First Office Action in Chinese application 201380031854.X (dated Sep. 11, 2015).
Second Office Action issued in CN application 201380031854.X. (dated May 13, 2016).
Third Office Action issued in CN application 201380031854.X (dated Dec. 6, 2016).
Supplemental Search Report and opinion dated May 2016 in application EP 13792144.0.
Response filed in application EP13792144.0 dated Aug. 30, 2016.
Office action issued in RU application 2014150798 dated Apr. 5, 2017.
Non-final office action from U.S. Appl. No. 14/401,749, dated Aug. 24, 2017.
Response filed in U.S. Appl. No. 14/401,749 dated Nov. 2017.
Notice of allowance issued in U.S. Appl. No. 14/401,749 dated Mar. 2018.
International Preliminary Report on Patentability and Written Opinion from PCT/US2013/041422, dated Nov. 18, 2014.

(56) References Cited

OTHER PUBLICATIONS

Search Report from PCT/US2013/041422, dated Nov. 21, 2013.
Third party obsevations submitted in PCT/US2013/041422 on Nov. 21, 2014.
Examination report dated May 2016 in AU application 2013277296.
Response filed Jul. 1, 2016 in AU application 2013277296.
Allowance dated Aug. 2016 in AU application 2013277296.
Second office action from application CN201380032071.3, dated Aug. 29, 2017.
First office action from application CN201380032071.3, dated Feb. 7, 2017.
Supplemental Search Report and opinion dated Feb. 2016 in EP application 13807874.2.
Response submitted Jul. 12, 2016 in EP application 13807874.2.
Office action issued in RU application 2015101234 dated Mar. 29, 2017.
Notice of allowance dated May 2016 in U.S. Appl. No. 14/409,132.
Notice of allowance dated Nov. 2016 in U.S. Appl. No. 14/409,132.
Notice of allowance dated Feb. 27, 2018 in U.S. Appl. No. 15/424,224.
International Preliminary Report on Patentability and Written Opinion from PCT/US2013/046409, dated Dec. 23, 2014.
Search Report from PCT/US2013/046409, dated Oct. 12, 2013.
Examination report dated May 2, 2016 in AU application 2013277335.
Response submitted Jul. 1, 2016 in AU application 2013277335.
Allowance dated Aug. 2016 in AU application 2013277335.
Office Action issued in application No. CN2013-80032039.5 (dated Sep. 1, 2015).
Second Office Action dated May 2016 in CN application 201380032039.5.
Third Office Action dated Nov. 2016 in CN application 201380032039.5.
Supplemental Search Report and opinion dated Feb. 2016 in EP application 13806430.8.
Response filed Jun. 23, 2016 in EP application 13806430.8.
Non-final rejection issued in U.S. Appl. No. 14/409,117 dated Jan. 25, 2081.
Response filed in U.S. Appl. No. 14/409,117 dated Apr. 25, 2018.
International Preliminary Report on Patentability and Written Opinion from PCT/US13/46328, dated Dec. 23, 2014.
Examination Report dated Feb. 2016 in AU application 2013277286.
Response filed May 2016 in AU application 2013277286.
Allowance dated Jun. 2016 in AU application 2013277286.
Examination reported dated Jun. 2017 in AU application 2016235014.
Office Action issued in application No. CN2013-80032056.9 (dated Sep. 6, 2015).
Second Office Action dated May 2016 in CN application 201380032056.9.
Third Office Action issued in application No. CN2013-80032056.9 (dated Nov. 2016).
Supplemental Search Report and opinion dated Dec. 2015 in EP application 13807611.2.
Response filed May 19, 2016 in EP application 13807611.2.
Grant notice dated Sep. 2016 in EP application 13807611.2.
Search report from EP application 17152493.7 dated May 2017.
Response filed in EP application No. 17152493.7 dated Oct. 16, 2017.
Grant notice dated Jan. 2018 in EP application No. 17152493.7.
Office action issued in application RU2015101287, dated Apr. 2017.
Office action issued in application RU2015101287, dated Jul. 2017.
Non-final office action issued in U.S. Appl. No. 14/409,124 dated Jan. 25, 2018.
Response filed in U.S. Appl. No. 14/409,124 dated Apr. 25, 2018.
Search Report from PCT/US13/46380, dated Oct. 9, 2013.
International Preliminary Report on Patentability and Written Opinion from PCT/US13/46380, dated Dec. 23, 2013.
Office Action from U.S. Appl. No. 14/483,455, dated Apr. 27, 2016.
Response filed in U.S. Appl. No. 14/483,455 dated Aug. 26, 2016.
Final Office Action from U.S. Appl. No. 14/483,455, dated Sep. 16, 2016.
Response filed in U.S. Appl. No. 14/483,455 dated Sep. 22, 2016.
Notice of Allowance issued in U.S. Appl. No. 14/483,455 dated Sep. 29, 2016.
Third party submission including statements of relevance submitted in U.S. Appl. No. 15/430,938 dated Aug. 24, 2017.
International Search Report with Written Opinion from PCT Application No. PCT/US2014/055086, dated Feb. 5, 2015.

* cited by examiner

SYSTEMS AND METHODS FOR THE MANAGEMENT OF WASTE ASSOCIATED WITH PROCESSING GUAYULE SHRUBS TO EXTRACT RUBBER

CROSS-REFERENCE TO RELATED APPLICATION

This application claims priority to and any other benefit of U.S. Provisional Patent Application Ser. No. 61/660,983, filed Jun. 18, 2012, and entitled "Systems and Methods for the Management of Waste Associated with Processing Guayule Shrubs to Extract Rubber," the entire disclosure of which is hereby incorporated by reference.

BACKGROUND

The guayule shrub is a well-known source of natural rubber (also called polyisoprene). This shrub stores rubber within the individual cells of the plant (e.g., stems, roots or leaves). While precise amounts may vary depending upon age of the shrub, growing conditions and species, the guayule shrub generally contains 1-10 weight percent rubber. Processes for removing the rubber from the guayule shrub generally entail extraction of rubber and resin from the shrub and the creation of a large amount of waste material which is primarily non-soluble woody material (commonly referred to as bagasse).

SUMMARY

Provided herein are systems and methods for managing the waste associated with the extraction of rubber from guayule shrubs. Also provided herein is a portable local sub-station for reducing the transportation costs associated with the processing of guayule shrubs for the extraction of rubber. Use of the disclosed systems, methods and/or local sub-station can reduce transportation costs, reduce processing costs and reduce the downstream processing complexity associated with the extraction of rubber from guayule shrubs.

In a first embodiment, a method for managing waste associated with the processing of guayule shrubs for the extraction of rubber is provided. The method comprises utilizing harvested guayule shrubs including leaves, bark, woody material, and optionally roots from a harvest site; utilizing a local sub-station to remove at least one of the leaves and dirt from the harvested guayule shrubs thereby producing a semi-processed guayule material with a weight that is at least 10% lower than the weight of the harvested guayule shrubs; and transporting the semi-processed guayule material to a remote rubber extraction plant capable of producing rubber, resin and waste bagasse from the semi-processed guayule material where the waste bagasse comprises at least 60% by weight of the semi-processed guayule material.

In a second embodiment, a portable local sub-station for reducing the transportation costs associated with the processing of guayule shrubs for the extraction of rubber is provided. The portable local sub-station comprises at least one of a chopper, a debarker, a briquetting machine, an air separator, a leaf remover and a compression machine suitable for initial processing of a quantity of harvested guayule shrub thereby reducing the weight of the harvested guayule shrub by at least 5%. The local sub-station is capable of being transported to multiple locations.

Also provided herein are systems relating to the processing of guayule shrubs for the extraction of rubber. In a first system embodiment, a system for managing waste associated with the processing of guayule shrubs for the extraction of rubber is provided. The system comprises a sub-system for receiving harvested guayule shrubs including leaves, bark, woody material and optionally roots from a harvest site; a pre-processing sub-system comprising a local sub-station for removing at least one of the leaves and root dirt from the harvested guayule shrubs thereby producing a semi-processed guayule material with a weight that is at least 5% lower than the weight of the harvested guayule shrubs.

In a second system embodiment, a system for pre-processing guayule shrubs prior to the extraction of rubber from the shrubs is provided. The system comprises a pre-processing sub-system comprising a local sub-station for receiving harvested guayule shrubs from a harvest site and for removing at least one of the leaves and root dirt from the harvested guayule shrubs thereby producing a semi-processed guayule material with a weight that is at least 5% lower than the weight of the harvested guayule shrubs, wherein the local processing sub-system is located within 25 miles of the harvest site.

DETAILED DESCRIPTION

Provided herein are systems and methods for managing the waste associated with the extraction of rubber from guayule shrubs. Also provided herein is a portable local sub-station for reducing the transportation costs associated with the processing of guayule shrubs for the extraction of rubber. Use of the disclosed systems, methods and/or local sub-station can reduce transportation costs, reduce processing costs and reduce the downstream processing complexity associated with the extraction of rubber from guayule shrubs.

Definitions

The terminology as set forth herein is for description of the embodiments only and should not be construed as limiting the invention as a whole.

As used herein, the term non-*Hevea* plant is intended to encompass plants that contain natural rubber within the individual cells of the plant.

As used herein the term "bagasse" is used to refer to that portion of the ground or chopped plant matter from a non-*Hevea* plant that is insoluble and hence is suspended rather than dissolved by organic solvents. As used herein, bagasse should be understood to include dirt and ash, unless otherwise specified.

As used herein the term "plant matter" means material obtained from a non-*Hevea* plant. Unless otherwise specified, the plant matter may include roots, stems, bark, woody material, pith, leaves and dirt.

As used herein the term "woody material" means the vascular tissue and meristematic material obtained from a non-*Hevea* plant. Unless otherwise specified, woody material does not include bark.

As used herein the term "bark" refers to the tough outer covering present on the stems and roots of certain (particularly woody or shrub-like) non-*Hevea* plants and should be understood to include all tissues outside the vascular cambium. Not all non-*Hevea* plants will contain bark.

As used herein the term "resin" means the naturally occurring non-rubber chemical entities present in non-*He-*

*vea* plant matter, including but not limited to resins (such as terpenes), fatty acids, proteins, and inorganic materials.

As used herein the term "dirt" (such as used in the connection with the solid purified rubber produced by the processes disclosed herein) means non-plant material that may be associated with non-*Hevea* plants, particularly upon harvesting, such as soil, sand, clay and small stones. Dirt content in solid purified rubber can be determined by completely redissolving the solid rubber and pouring the solution through a 45 micron sieve. The sieve is then rinsed with additional solvent and dried. The weight of the material retained on the sieve represents the "dirt" content of the solid purified rubber.

In a first embodiment, a method for managing waste associated with the processing of guayule shrubs for the extraction of rubber is provided. The method comprises utilizing harvested guayule shrubs including leaves, bark, woody material, and optionally roots from a harvest site; utilizing a local sub-station to remove at least one of the leaves and dirt from the harvested guayule shrubs thereby producing a semi-processed guayule material with a weight that is at least 10% lower than the weight of the harvested guayule shrubs; and transporting the semi-processed guayule material to a remote rubber extraction plant capable of producing rubber, resin and waste bagasse from the semi-processed guayule material where the waste bagasse comprises at least 60% by weight of the semi-processed guayule material. (It should be understood that the terms process and method, as used with respect to the first embodiment, are used interchangeably herein.)

In a first sub-embodiment of the first embodiment, a method for managing waste associated with the processing of guayule shrubs for the extraction of rubber is provided. The method comprises utilizing harvested guayule shrubs including leaves, roots, bark and woody material from a harvest site; utilizing a local sub-station to remove at least one of the leaves and root dirt from the harvested guayule shrubs thereby producing a semi-processed guayule material with a weight that is at least 5% lower than the weight of the harvested guayule shrubs; and transporting the semi-processed guayule material to a remote rubber extraction plant capable of producing rubber, resin and waste bagasse from the semi-processed guayule material where the waste bagasse comprises at least 60% by weight of the semi-processed guayule material (on a dry weight basis).

In a second sub-embodiment of the first embodiment, a method for managing waste associated with the processing of guayule shrubs for the extraction of rubber is provided. The method comprises utilizing harvested guayule shrubs including leaves, bark and woody material from a harvest site; utilizing a local sub-station to remove at least one of the leaves and root dirt from the harvested guayule shrubs thereby producing a semi-processed guayule material with a weight that is at least 5% lower than the weight of the harvested guayule shrubs; and transporting the semi-processed guayule material to a remote rubber extraction plant capable of producing rubber, resin and waste bagasse from the semi-processed guayule material where the waste bagasse comprises at least 60% by weight of the semi-processed guayule material (on a dry weight basis).

In a third sub-embodiment of the first embodiment, a method for managing waste associated with the processing of guayule shrubs for the extraction of rubber is provided. The method comprises utilizing harvested guayule shrubs including leaves, bark and woody material from a harvest site; utilizing a local sub-station to perform at least one of leaf removal, root dirt removal and woody material and bark separation from the harvested guayule shrubs thereby producing a semi-processed guayule material with a weight that is at least 20% lower than the weight of the harvested guayule shrubs; and transporting the semi-processed guayule material to a remote rubber extraction plant capable of producing rubber, resin and waste bagasse from the semi-processed guayule material where the waste bagasse comprises at least 60% by weight of the semi-processed guayule material (on a dry weight basis).

In a second embodiment, a portable local sub-station for reducing the transportation costs associated with the processing of guayule shrubs for the extraction of rubber is provided. The portable local sub-station comprises at least one of a chopper, a debarker, a briquetting machine, an air separator, a leaf remover and a compression machine suitable for initial processing of a quantity of harvested guayule shrub thereby reducing the weight of the harvested guayule shrub by at least 5%. The local sub-station is capable of being transported to multiple locations.

Also provided herein are systems relating to the processing of guayule shrubs for the extraction of rubber. In a first system embodiment, a system for managing waste associated with the processing of guayule shrubs for the extraction of rubber is provided. The system comprises a sub-system for receiving harvested guayule shrubs including leaves, bark, woody material and optionally roots from a harvest site; a pre-processing sub-system comprising a local sub-station for removing at least one of the leaves and root dirt from the harvested guayule shrubs thereby producing a semi-processed guayule material with a weight that is at least 5% lower than the weight of the harvested guayule shrubs; and a transportation sub-system for transporting the semi-processed guayule material to a remote rubber extraction plant capable of producing rubber, resin and waste bagasse where the waste bagasse comprises at least 60% by weight of the semi-processed guayule material (on a dry weight basis).

In a second system embodiment, a system for pre-processing guayule shrubs prior to the extraction of rubber from the shrubs is provided. The system comprises a pre-processing sub-system comprising a local sub-station for receiving harvested guayule shrubs from a harvest site and for removing at least one of the leaves and root dirt from the harvested guayule shrubs thereby producing a semi-processed guayule material with a weight that is at least 5% lower than the weight of the harvested guayule shrubs, wherein the local processing sub-system is located within 25 miles of the harvest site.

In a third system embodiment, a system for processing guayule shrubs to extract rubber from the shrubs that comprises a remote rubber extraction plant for receiving pre-processed guayule shrub material from a pre-processing site and for further processing the pre-processed guayule shrub material to produce rubber, resin and waste bagasse is provided. The pre-processed guayule shrub material that is received at the remote rubber extraction plant has been pre-processed to remove at least one of the leaves and root dirt thereby eliminating or reducing the need for such removal at the remote rubber extraction plant. In such embodiments, the remote rubber extraction plant is located more than 10 miles from the pre-processing site.

As previously discussed, in a first sub-embodiment of the first embodiment of the methods disclosed herein, the harvested guayule shrubs include leaves, roots, bark and woody material and the local sub-station of the first embodiment is used to remove at least one of the leaves and root dirt from the harvested guayule shrubs. In a second sub-embodiment of the first embodiment of the methods disclosed herein, the harvested guayule shrubs include leaves, bark and woody material and the local sub-station is used to remove at least one of the leaves and root dirt from the harvested guayule shrubs. In a third sub-embodiment of the first embodiment of the methods disclosed herein, the harvested guayule shrubs include leaves, bark and woody material and the local sub-station is used to perform at least one of leaf removal, root dirt removal and bark and woody material separation. (The harvested guayule shrubs that are utilized in the second embodiment and in the first, second and third embodiments of the systems disclosed herein can have any of the foregoing compositions.) Generally, leaf removal may be desirable because the leaves of the guayule shrub contain a relatively lower percentage of rubber as compared to the woody material. Similarly, it may also be desirable to remove the root dirt from the harvested guayule shrubs to prevent the dirt from entering the ultimate rubber extraction process since fine particles of dirt can contaminate the guayule rubber and lead to a lower grade, less desirable rubber product. In certain embodiments according to the first embodiment, separation of the bark and woody material from the harvested guayule shrubs may be desirable to form two streams of material from which rubber may be extracted. In certain embodiments, the bark stream and the woody material stream may be subjected to different subsequent treatments such as different types of compression into briquettes and even different rubber extraction procedures at a remote rubber extraction plant. In certain embodiments according to the first, second and third sub-embodiments of the first embodiment of the processes disclosed herein and of the systems disclosed herein and the second embodiment disclosed herein, the portable sub-station is used to remove the leaves and the root dirt from the harvested guayule shrubs. Generally, the incorporation of pre-processing processes such as one or more of leaf removal, root dirt removal, chopping, compression and bark and woody material separation at a location separate from the location where rubber extraction occurs can simplify the rubber extraction process in that relatively fewer steps (and, hence, relatively fewer pieces of equipment) are required during the rubber extraction process.

In certain embodiments according to the first, second and third sub-embodiments of the first embodiment of the processes disclosed herein and of the systems disclosed herein and the second embodiment disclosed herein, it may be desirable to have twigs and pieces of dead plant matter removed at the sub-station since these components have either lower overall rubber contents and/or contain degraded rubber (i.e., lower molecular weight).

In preferred embodiments according to the first, second and third sub-embodiments of the first embodiment of the processes disclosed herein and systems disclosed herein and the second embodiment disclosed herein, the local sub-station is located relatively near to the harvest site where the guayule shrubs are grown and harvested so as to facilitate easy delivery of the harvested guayule shrubs to the local sub-station. In certain embodiments, the sub-station is located within 25 miles, within 5 miles, within 1 mile, within ½ mile or even within ¼ mile of the harvest site. Conversely, the remote rubber extraction plant is located relatively remotely from the harvest site such that transportation of the entire guayule shrub without pre-processing at the local sub-station can lead to high transportation costs. In certain embodiments, the remote rubber extraction plant is located more than 10 miles, more than 25 miles or even more than 100 miles from the harvest site and/or from the site where the sub-station is located. It is specifically contemplated that the remote rubber extraction plant may take various forms and employ various processes for extracting the rubber from the guayule shrub, including, but not limited to aqueous extraction and organic solvent extraction. Exemplary methods for organic solvent extraction of rubber from guayule shrubs are disclosed in U.S. Patent Applications Ser. Nos. 61/607,448, 61/607,460 and 61/607,469, the entire disclosure of each being herein incorporated by reference.

In certain embodiments according to the first, second and third sub-embodiments of the first embodiment of the processes disclosed herein and according to the first, second and third embodiments of the systems disclosed herein the sub-station is portable. The degree of portability may vary. In preferred embodiments, the portable local sub-station may be located and utilized on a transportable platform or surface such as a trailer bed. In such embodiments, the re-location of the sub-station to a new sub-station location for initial processing of the harvested guayule shrub and/or the re-location of the sub-station to the remote rubber extraction plant will be relatively easy. In other embodiments, the sub-station may be portable in terms of being capable of being loaded onto a truck or moved via another transportation device for delivery to a suitable sub-station location or to the remote rubber extraction plant, off loaded from the transportation device and useable after placement on the ground, located at or near the harvest site or remote rubber extraction plant on a platform (with or without mounting fixtures) or temporarily installable in a building or other shelter (again, with or without mounting fixtures) at or near the harvest site or remote rubber extraction plant. Preferably, the portable sub-station is configured such that it is usable within no more than a few hours (i.e., 2-4 hours or less) of being moved to a new location. In certain embodiments according to the first, second and third sub-embodiments of the first embodiment of the processes disclosed herein and of the systems disclosed herein and according to the second embodiment disclosed herein, the sub-station is re-located from a first local location that is no more than 5 miles (preferably no more than 1 mile) from a first harvest site to a second local location that is not more than 5 miles (preferably no more than 1 mile) from a second harvest site. Such an embodiment allows for the movement of a local sub-station to more than one harvest site where the harvest sites may be different farm locations that are located various distances from each other (e.g., more than 10 miles apart, more than 20 miles apart or even more than 100 miles apart) and are also each relatively remote from the remote rubber extraction plant (e.g., each more than 10 miles from the remote rubber extraction plant). Such movement to accommodate various harvest sites can have the advantage of achieving more efficient use of equipment as a particular harvest site will likely only harvest guayule shrubs during a certain period or periods during the year.

The local sub-station may contain various types of equipment in order to remove at least one of the leaves, roots and bark from the harvested guayule shrub. Various methods for removing leaves from shrubs are known and the methods disclosed herein should not be considered to be particularly limited to any individual method. For example, in certain embodiments, leaf removal may be facilitated by the use of blown air, shaking or a combination of both. In certain embodiments, leaf removal can be facilitated by allowing the harvested guayule shrubs to dry in the field (e.g., for several days up to 2-3 weeks) whereby the leaves will tend to become dry and brittle and more easily removable. Various methods for removing dirt from the roots of shrubs exist and the methods disclosed herein should not be considered to be particularly limited to any individual method of root dirt removal. For example, in certain embodiments, root dirt removal may be achieved by shaking, vibrating, air blowing, air separator, and the use of water pressure. Various methods for separating or removing bark from the woody material of shrubs are known and the methods disclosed herein should not be considered to be particularly limited to any individual method of bark removal or separation. In certain embodiments, bark removal/separation can be facilitated by the use of a rice polisher, a drum debarker or a hydraulic debarker. A drum debarker uses a rotating drum to remove the bark. A hydraulic debarker uses high pressure water to remove the bark.

In certain embodiments according to the first, second and third sub-embodiments of the first embodiment of the processes disclosed herein and of the systems disclosed herein and the second embodiment disclosed herein, the local sub-station will also include a chopper that is capable of chopping the harvested guayule shrub into pieces having an average length of 1/4" to 4". (Preferably, any chopping is conducted subsequent to the leaf removal and/or root dirt removal. However, in certain embodiments, depending upon the type of leaf removal and/or root dirt removal utilized, it can be feasible to chop the harvested guayule shrub into pieces prior to leaf removal and/or root dirt removal.) The chopped pieces may be more easily transported to the remote rubber extraction plant and can also decrease the amount of processing that is required at the remote rubber extraction plant during the rubber extraction process. Various methods exist for chopping woody materials such as guayule shrubs and the methods disclosed herein should not be considered to be particularly limited to any individual method. For example, one exemplary way of obtaining chopped plant matter is to feed raw plant material into a shredder, a granulator or a hammer mill. A granulator is a well-known machine designed for chopping or grinding material into various sizes. Most granulators contain multiple knives (often steel knives) and one or more screens (sometimes interchangeable) with various diameter holes to determine the size of the final product. Various size granulators exist and may be useful in chopping the plant matter such as those containing openings of 3/8", 1/4" and 1/8". A hammer mill can generally be described as a steel drum containing a vertical or horizontal rotating shaft or drum on which hammers are mounted; the hammers "pound" the material that is passed through the mill. Various size hammer mills exist and may be useful in chopping the plant matter such as those containing openings of 3/8", 1/4" and 1/8".

In certain embodiments according to the first, second and third sub-embodiments of the first embodiment of the processes disclosed herein and of the systems disclosed herein and according to the second embodiment disclosed herein, the local sub-station will also include a compression machine that is capable of compressing the chopped plant matter into a more dense form such as a briquette or a pellet. In certain embodiments, the compressed material is a briquette or pellet that has a density that is 150-325% higher than the density of the non-compressed chopped plant matter. Producing such briquettes at a location local to the harvest site or sites can lead to reduced shipping and transportation costs as relatively more briquettes (and, hence more rubber) can be transported to the remote rubber extraction plant or stored (at the location of the local sub-station, at the remote rubber extraction plant or at another location) within the same volume of shipping or storage container. In yet other embodiments, the briquettes have a density that is 40-100% higher than the density of the non-compressed chopped plant matter. Briquettes with such densities can provide advantages in terms of being easier to produce and easier to grind and dissolve in organic solvent. In certain embodiments, the briquettes have a density of 3 to 8.5 pounds/gallon (0.4 to 1 kg/liter). This density is the true density of the briquettes (excluding the volume of pores) and not a bulk density. Various methods (e.g., optical, gas expansion and liquid imbibitions) for determining the true density of a porous solid exist and are known to those skilled in the art, but they all generally entail measuring the volume of pores existing within the porous solid so that this volume can be excluded from the volume that is used to calculate true density.

In those embodiments of the first, second and third sub-embodiment of the first embodiment of the processes disclosed herein and of the systems disclosed herein and of the second embodiment disclosed herein, where the local sub-station includes a compression machine or briquetting machine, the briquettes, pellets or other compressed form that is produced may contain a certain amount of water. In certain embodiments, the briquettes contain 2-20% by weight water (based upon the total weight of the briquette). In other embodiments the briquettes contain 5-15% by weight water. The water that is within the briquettes has as its primary source residual water from the plant matter. The amount of water present in the briquettes can be adjusted such as by drying the chopped plant matter prior to compacting it into briquettes. In certain embodiments, the chopped plant matter is dried to reduce its moisture content by at least 2 weight %, by at least 4 weight % or even by at least 6 weight % prior to compacting the plant matter into briquettes. Various methods of achieving drying of the chopped plant matter can be utilized, including, but not limited to, sun drying, forced air drying (with air that is dry and/or heated). In certain embodiments, the plant matter may be dried prior to chopping. Another potential source for the water that may be present in the briquettes is additives added to the plant matter after harvest. As discussed in more detail later, these additives can include antioxidants and/or binders that may optionally be applied via aqueous solutions of the active ingredients.

In certain embodiments according to the first, second and third sub-embodiments of the first embodiment of the processes disclosed herein and of the systems disclosed herein and according to the second embodiment disclosed herein, the local sub-station includes a chopper. In certain such embodiments, the plant matter comprises chopped guayule shrub including bark and woody tissue from the shrub but with no more than 5 weight %, preferably no more than 4 weight % or no more than 3 weight % or even more preferably no more than 1 weight % of the plant matter comprising leaves from the guayule shrub. In certain of the foregoing embodiments, the guayule shrub used for the plant matter initially comprises both the above-ground portions and below-ground portions of the shrub (i.e., the stems (with bark, woody tissue and pith) and the roots). In other of the foregoing embodiments, the guayule shrub used for the plant matter initially comprises only the above-ground portions of the shrub (in other words, the roots are not included in the plant matter). The leaves of the guayule shrub may be removed using various methods such as field drying followed by shaking. Other methods for removing the leaves from the plant matter of the guayule shrub before incorporating that plant matter into briquettes may be utilized as the particular method for removing leaves is not considered to be a significant limitation of the processes and systems disclosed herein.

In certain embodiments, according to the first, second and third sub-embodiments of the first embodiment of the processes disclosed herein and of the systems disclosed herein and according to the second embodiment disclosed herein, the local sub-station prepares briquettes from plant matter containing a combination of bagasse, rubber and resin. In certain embodiments, the plant matter utilized in the briquettes includes bark, woody material, rubber and resin. In certain embodiments, woody material comprises at least 70 weight %, at least 80 weight %, at least 85 weight % or even at least 90 weight % of the briquette and the remaining amount of the briquette comprises bark and leaves. In order to achieve the foregoing make-up of plant matter within the briquette it may be necessary to remove or limit the amount of bark and leaves that is utilized within the plant matter and compacted into briquettes. In yet other embodiments, bark comprises at least 50 weight %, at least 60 weight %, at least 70 weight % or even at least 80 weight % of the briquettes and the remaining amount of the briquettes comprise woody material and leaves. In order to achieve the foregoing make-up of plant matter within the briquettes it will likely be necessary to remove or limit the amount of woody material and leaves that is utilized within the plant matte and compacted into briquettes. In certain embodiments, the briquettes comprise at least 80 weight % bark, less than 20 weight % woody material and less than 1 weight % leaves. In order to achieve the foregoing make-up of plant matter within the briquettes it will likely be necessary to remove or limit the amount of woody material and leaves that is utilized within the plant matter and compacted into briquettes. In yet other embodiments, the briquettes contain less than 5 weight % woody material, with the remaining amount of the briquettes comprising up to 95 weight % bark and preferably less than 2 weight % leaves, even more preferably less than 1 weight % leaves. Each portion of the plant matter (i.e., bark, woody material, roots and leaves) used within the briquettes will contain varying amounts of bagasse, rubber, resin and water.

As used herein the terms briquette and pellet are used interchangeably and should be construed broadly to encompass various forms or shapes, including, but not limited to, pellets, cubes, rectangular solids, spherical solids, egg-shaped solids, bricks and cakes. Various methods exist for compacting the plant matter into briquettes. One method of preparing briquettes from the plant matter is to utilize a commercial briquetting machine to prepare the briquettes. Various companies manufacture these machines and they are available in various sizes and specifications. Exemplary briquetting machines include those manufactured by K.R. Komarek, Inc. (Wood Dale, Ill.), including the roll-type briquetting machines model no. B100R and BR200QC. Generally, a briquetting machine utilizes a roll-type system to compact material, with or without the addition of a binder to the material that is being compressed. Pressure can be applied by the machine in varying amounts depending upon the machine utilized, the properties of the chipped plant matter and the properties desired in the briquettes. In certain embodiments, of plant matter from guayule shrubs are made using a briquetting machine. In certain of the foregoing embodiments, a binder is applied to the chipped plant matter prior to its being compressed into briquettes. Other methods of preparing briquettes of chopped plant matter from non-Hevea plants may be utilized within the scope of the processes and systems disclosed herein. In this regard, the disclosure of U.S. Patent Application Ser. No. 61/607,475 entitled "Processes For Recovering Rubber From Non-Hevea Plants Using Briquettes" is herein incorporated by reference.

In certain embodiments, the briquettes made by the local sub-station are made from chopped plant matter that has been treated with one or more binders prior to compression into briquettes. Various types of binders may be utilized, including, but not limited to, organic-based binders (such as wood products, clay, starches and ash), chemical-based binders (such as -sulfonate, lime, and sodiumbentonite and liquids such as water. The amount of binder utilized with the chipped plant matter may vary depending upon the type of briquette being formed. In certain embodiments, the amount of binder utilized with the briquette is 0.1-5 weight % (based on the total weight of the briquette).

In certain embodiments, the briquettes made by the local sub-station are made from chopped plant matter that has been treated with one or more antioxidants prior to compression into briquettes. Suitable compounds for use as the one or more antioxidants in certain embodiments include, but are not limited to, 2,6-di-t-butyl-4-methylphenol (also known as 2,6-di-t-butyl-p-cresol); N-(1,3-dimethylbutyl)-N'-phenyl-1,4-benzenediamine; octadecyl-3-(3,5-di-tert.butyl-4-hydroxyphenyl)-propionate (commercially available as Irganox® 1076); 4,6-bis (octylthiomethyl)-o-cresol (commercially available as Irganox® 1520), monohydric hindered phenols such as 6-t-butyl-2,4-xylenol, styrenated phenols, butylated octylphenols; bisphens, for example 4,4'-butylidenebis(6-t-butyl-m-cresol), polybutylated bisphenol A, hindered hydroquinones such as 2,4-di-t-amylhydroquinone; polyphenols, such as butylated p-cresol-dicyclopentadiene copolymer; phenolic sulfides such as 4,4'-thiobis(6-t-butyl-3-methyl-phenol), alkylated-arylated bisphenol phosphites such as tris(nonylphenyl)phosphite, triazinetriones such as alkylated hydroxycinnamate triester of tris(2-hydroxyethyl)-triazinetrione, tris(alkyhydroxybenzyl)-triazinetrione; pentaerythritol esters such as tetrakis (methylene-3,5-di-t-butyl-4-hydroxyhydrocinnamate)-methane; substituted diphenylamines such as octylated diphenylamines, p-(p-touenesulfonamido)-di-phenylamine, nonylated diphenylamine, diisobutylene-diphenylamine reaction products; dihydroquinolines such as 6-dodecyl-1, 2-dihydro-2,2,4-trimethylquinoline; dihydroquinoline polymers such as 1,2-dihydro-2,2,4-trimethylquinoline polymer; mercaptobenz-imidazoles such as 2-mercaptobenzimidazole; metal dithiocarbamates such as nickel dibutyldithiocarbamate, nickel diisobutyldithiocarbamate, nickel dimethyldithiocarbamate; ketone/aldehyde-arylamine reaction products such as aniline-butyraldehyde condensation products, diarylamine-ketone-aldehyde reaction products; and substituted p-phenylenediamines such as di-b-naphthyl-p-phenylenephenylenediamine and N-phenyl-N'-cyclohexyl-p-phenylenediamine. The total amount of the antioxidant employed in those embodiments that utilize at least one antioxidant may be in the range of 0.2-2 weight % of the purified solid rubber ultimately produced by the process (based upon the weight of the purified solid rubber containing less than 0.8 weight % solvent).

In certain embodiments, the plant matter that is compressed into the briquettes by the local sub-station has not only been chopped but has also been subjected to a roller mill/cracker mill, flaker mill/flaker, hammer mill and/or other mechanical treatment capable of rupturing the cell walls of the cells that contain the natural rubber. A roller mill/cracker mill can generally be described as a device with two or more rolls each containing longitudinal grooves which assist in further size reduction of material fed through the mill. A flaker mill or flaker can generally be described as a device with two or more rolls each having a smooth surface, usually operated at different speeds, with a defined and adjustable clearance between rolls which primarily assist in providing further rupturing of plant cell walls. A hammer mill can generally be described as a steel drum containing a vertical or horizontal rotating shaft or drum on which hammers are mounted; the hammers "pound" the material that is passed through the mill. Such types of mechanical treatment tend to increase the amount of natural rubber that can ultimately be recovered from the plant matter. In certain embodiments, chopped plant matter from the guayule shrub is used for the briquettes, and the chipped plant matter is subjected to at least one of roll milling, flake milling and hammer milling prior to compression into a briquette. In those embodiments where at least one of roll milling, flake milling or hammer milling is used upon the chipped plant matter, the chopped plant matter is preferably treated with at least one antioxidant prior to being compressed into a briquette (the amount of the antioxidant being in accordance with the previous antioxidant discussion).

In certain embodiments, the briquettes are capable of being stored for at least 90 days after compacting while still having the rubber contained within the briquettes retain a molecular weight of at least 800,000, preferably at least 1,000,000. The briquettes may be stored at a location at or near the location of the sub-station, at or near the rubber extraction plant or at a separate location such as one capable of providing temperature or other environmental controls. In certain preferred embodiments, the briquettes are made of chopped plant matter from a guayule shrub and the briquettes are capable of being stored for at least 90 days after compacting while still having the rubber contained within the briquettes retain a molecular weight of at least 800,000, preferably at least 1,000,000. In other embodiments, the briquettes are capable of being stored for at least 7 months (210 days) after compacting while still having the rubber contained within the briquettes retain a molecular weight of at least 800,000, preferably at least 1,000,000. In certain preferred embodiments, the briquettes are made of chipped plant matter from a guayule shrub and the briquettes are capable of being stored for at least 7 months (210 days) after compacting while still having the rubber contained within the briquettes retain a molecular weight of at least 800,000, preferably at least 1,000,000.

While the sub-embodiments of the first, second and third embodiments of the first embodiment of the processes disclosed herein, the embodiments of the systems disclosed herein, and of the second embodiment disclosed herein have been discussed primarily in terms of one local sub-station and one remote rubber extraction plant, it should be considered to be within the spirit of the current disclosure to utilize more than one local sub-station and/or to utilize more than one remote rubber extraction plant. For example, depending upon the size and number of the harvest sites and the size of the remote rubber extraction, it may be advantageous to utilize more than one local sub-station (e.g., two local sub-stations, three local sub-stations or more).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for managing waste from the processing of guayule shrubs for the extraction of rubber, the method comprising:
   utilizing harvested guayule shrubs including leaves, bark, and woody material from a harvest site;
   utilizing a portable local sub-station to (1) remove at least one of the leaves and dirt from the harvested guayule shrubs thereby producing a semi-processed guayule material with a weight that is at least 10% lower than the weight of the harvested guayule shrubs and (2) chop the semi-processed guayule material into pieces having an average length of ¼" to 4" after removing at least one of the leaves and dirt but prior to transporting; and
   transporting the semi-processed guayule material to a remote rubber extraction plant configured to produce rubber, resin and waste bagasse from the semi-processed guayule material where the waste bagasse comprises at least 60% by weight of the semi-processed guayule material wherein the remote rubber extraction plant is located greater than 10 miles from the harvest site and from the portable local sub-station.

2. The method according to claim 1, wherein the chopping is performed by utilizing at least one of a shredder, a granulator or a hammer mill.

3. The method according to claim 1, wherein the portable local sub-station further includes a compression machine which compresses the chopped pieces into briquettes or pellets with a density that is at least 150% higher than the uncompressed pieces prior to transporting.

4. The method according to claim 1, wherein at least one of the portable local sub-station and remote rubber extraction plant is located within 25 miles of the harvest site.

5. The method according to claim 1, wherein the method further comprises re-locating the portable local sub-station to the remote rubber extraction plant and processing waste bagasse into briquettes having a density that is at least 40% higher than the density of the waste bagasse.

6. The method according to claim 1, wherein the portable local sub-station further includes at least one device selected from the group consisting of a briquetting machine, an air separator, a leaf remover, a rice polisher, a root remover, a debarker and a compression machine.

7. The method according to claim 1, wherein the portable local sub-station further performs woody materials and bark separation from the harvested guayule shrubs thereby producing a semi-processed guayule material with a weight that is at least 20% lower than the weight of the harvested guayule shrubs.

8. The method according to claim 1, where the method further comprises re-locating the local sub-station from a first local location that is within 5 miles of the harvest site to a second local location that is within 5 miles of a second harvest site.

9. The method of claim 1, wherein the harvested guayule shrubs further include roots.

10. A system for managing waste from the processing of guayule shrubs for the extraction of rubber, the system comprising:
- a sub-system configured to receive harvested guayule shrubs including leaves, bark, and woody material from a harvest site; and
- a pre-processing sub-system comprising a portable local sub-station configured to first remove at least one of the leaves and root dirt from the harvested guayule shrubs and then chop the pre-processed guayule material into pieces having an average length of ¼" to 4" after removing at least one of the leaves and dirt but prior to transporting, thereby producing a semi-processed guayule material with a weight that is at least 5% lower than the weight of the harvested guayule shrubs.

11. The system according to claim 10, wherein the pre-processing sub-system comprises a portable local sub-station located within 25 miles of the harvest site.

12. The system according to claim 11, further comprising a transportation sub-system for transporting the semi-processed guayule material to a remote rubber extraction plant configured to produce rubber, resin and waste bagasse from the semi-processed guayule material where the waste bagasse comprises at least 60% by weight of the semi-processed guayule material wherein the remote rubber extraction plant is located greater than 10 miles from the harvest site and from the portable local sub-station.

13. The system according to claim 11, further comprising re-locating the portable local sub-station to the remote rubber extraction plant and processing the waste bagasse into briquettes having a density that is at least 40% higher than the density of the waste bagasse.

14. The system according to claim 11, further comprises a harvesting sub-system configured to harvest the guayule shrubs from a harvest site.

15. The system according to claim 11 wherein the portable local sub-station includes a compression machine configured to compress the pieces into briquettes or pellets with a density that is at least 40% higher than the uncompressed pieces prior to transporting.

16. The system according to claim 11, wherein the chopping is performed by utilizing at least one of a shredder, a granulator or a hammer mill.

17. The system according to claim 11 wherein the portable local sub-station further includes at least one device selected from the group consisting of a briquetting machine, an air separator, a leaf remover, a rice polisher, a root remover, and a debarker.

* * * * *